United States Patent [19]
Thoen

[11] Patent Number: 5,201,484
[45] Date of Patent: Apr. 13, 1993

[54] STACKING CABLE CLAMP

[76] Inventor: Bud Thoen, 1201 Fireman's Lodge Rd., Alexandria, Minn. 56308

[21] Appl. No.: 757,976

[22] Filed: Sep. 12, 1991

[51] Int. Cl.$^5$ .............................................. F16L 3/22
[52] U.S. Cl. ................................... 248/68.1; 248/71; 248/74.2
[58] Field of Search ............... 248/316.7, 71, 74.1, 248/74.2, 73, 63, 68.1, 74.5; 24/703.1, 543, 115 A

[56] References Cited

U.S. PATENT DOCUMENTS

| 4,306,697 | 12/1981 | Mathews | 248/68.1 |
| 4,395,009 | 7/1983 | Bormke | 248/68.1 |
| 4,817,910 | 4/1989 | Molnar et al. | 248/68.1 |

FOREIGN PATENT DOCUMENTS

V4998 9/1955 Fed. Rep. of Germany.

Primary Examiner—Blair M. Johnson
Attorney, Agent, or Firm—Peterson, Wicks, Nemer & Kamrath

[57] ABSTRACT

A clamp (10) for fastening electrical cables in a stacked arrangement is disclosed including a fastening strap (12) and a stacking staple (112). The fastening strap (12) is generally of a standard design but includes oppositely issuing ears (34) extending from the top (14) thereof. The staple (112) includes first and second latching hooks (134) extending downwardly from the opposite ends of the top (114) and generally parallel to but spaced outwardly from legs (124) also extending downwardly from the top (114). The latching hooks (134) are generally elongated Z shaped and include a first portion (146) having the same outer extent as the top (114) and a second portion (148) having an inner extent for slideable receipt on the outer surface (152) of the first portion (146). The second portion (148) includes a hooking aperture (156) for slideable receipt of the latching ear (34). The staple (112) further includes oppositely issuing ears (34) extending from the top (114) thereof which allow stacking of multiple staples (112) on a single strap (12).

20 Claims, 1 Drawing Sheet

STACKING CABLE CLAMP

BACKGROUND

The present invention generally relates to clamps for electrical cables or the like, and particularly to clamps for holding cables in a stacked manner.

Due to the possibility of nails or screws penetrating electrical cables and the inherent dangers arising therefrom especially in concealed locations, it is desirable to install and support the cable or raceway so that the nearest outside surface of the cable or raceway is located a distance from the nearest edge of the framing member equal to or greater than the depth of penetration of nails or screws into the framing member. However, often multiple cables or raceways are desired to be installed to a face of a framing member, with the depth of the face being insufficient to allow all the cables or raceways to be installed against the face and still maintain the penetration safety distance. In such cases, it is necessary to install the cables or raceways in a stacked or bundled arrangement perpendicular to the face of the framing member rather than in a parallel arrangement to the face of the framing member.

Prior attempts to allow cable stacking typically utilized specially manufactured fasteners. This is undesirable as often after a first cable is installed utilizing prior single cable fasteners, it later becomes desirable to add a second or more cable thereafter. Thus, it is an object of the present invention to provide a cable clamp which allows the installation of a single cable in a similar manner as prior single cable fasteners and which allows the later installation of further cables in a stacked arrangement without requiring removal of the first cable fastener or without providing redundant fasteners.

Likewise, prior attempts to allow cable stacking utilized particularly dimensioned fasteners for each possibility of combination of electrical cables. This required the electrician to have an inventory of each size and type fastener at the job site and to select the particular size and type of fastener for the particular installation. Thus, it is an object of the present invention to provide a cable clamp having reduced number of components (and particularly two components) which are able to install a large variety to types, sizes, and numbers of cables.

Further, prior attempts to allow cable stacking utilized supports which to grip the cable, required crimping or similar installation steps often requiring the use of tools such as pliers. Thus, it is an object of the present invention to provide a cable clamp which allows stacking installation without the use of tools and which allows nondestructable removal and replacement if desired.

Similarly, prior attempts to allow cable stacking utilized fasteners having a particular number of cable support locations. This presents limitations as only a maximum number of cables can be stacked and excessive capacity is provided when less than the maximum number of cables are desired to be stacked. Thus, it is an object of the present invention to provide a cable clamp which provides a staple for each cable desired to be stacked allowing relatively unlimited stacking of cables and without providing excessive capacity.

Furthermore, prior attempts to allow stacking utilized fasteners which do not grip the stacked cables with the same force as prior single cable fasteners. Specifically, such prior fasteners allowed the cables to be released if the cables were pulled outwardly. Thus, it is an object of the present invention to provide a cable clamp which holds the stacked cables to prevent release even under relatively large forces.

Further, it is an object of the present invention to provide a cable clamp including portions located between the cables in the clamp to separate the cables and reduce potential heating that can occur if cables are stacked together. Additionally, it is a further object to provide a cable clamp which holds the cables in a neat, organized manner.

Briefly, the present invention solves the problem of installing cables or raceways in a stacked or bundled arrangement by providing, in an aspect of the present invention, a staple including first and second latching hooks extending from the bottom surface of the top adjacent to the ends of the top and spaced outwardly from first and second legs also extending from the bottom surface of the top adjacent to the ends of the top, with the latching hooks extending beyond the legs.

In a further aspect, a staple is provided including first and second latching hooks extending from the bottom surface of the top adjacent to the ends of the top, with the latching hooks including first and second portions, with the inner surface of the second portion being slideable on the outer surface of the first portion when the staples are stacked.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
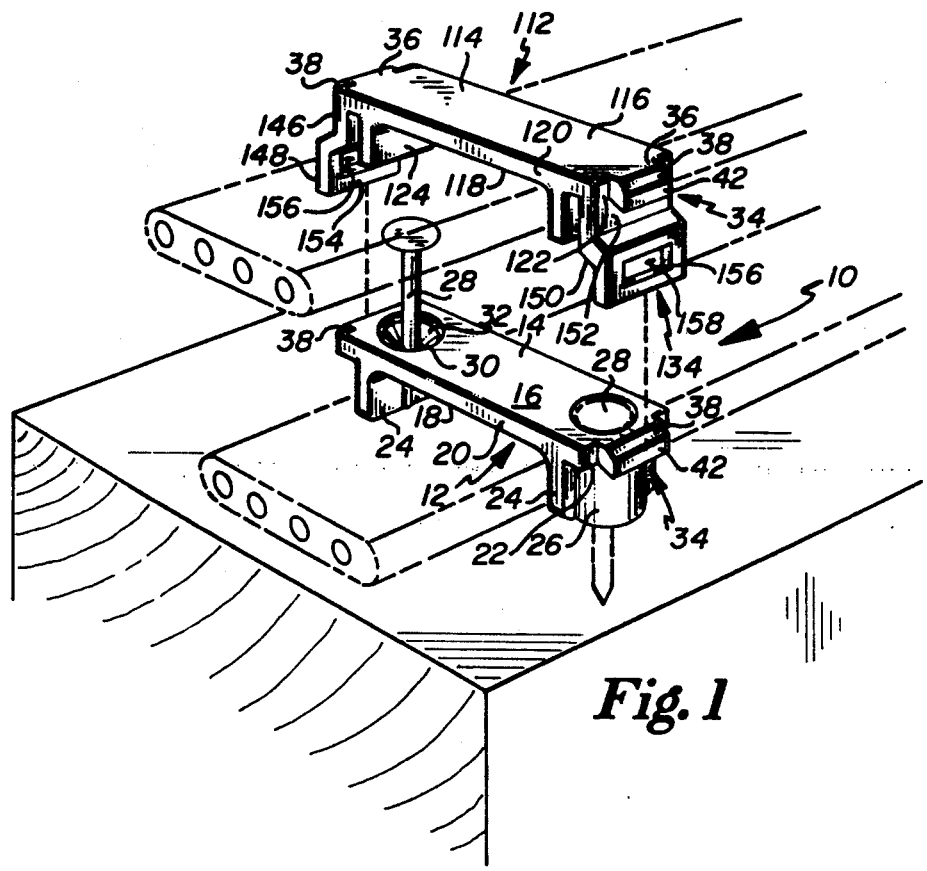
FIG. 1 shows an exploded perspective view of a staple and fastening strap of the preferred form of a stacking cable clamp according to the preferred teachings of the present invention, with electrical cables shown in phantom.
Figure 2:
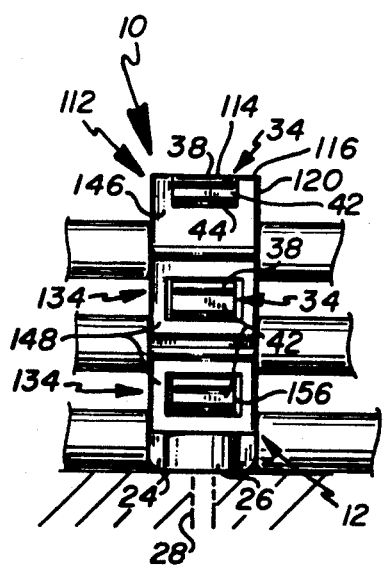
FIG. 2 shows an end elevational view of the stacking cable clamp of FIG. 1.
Figure 3:
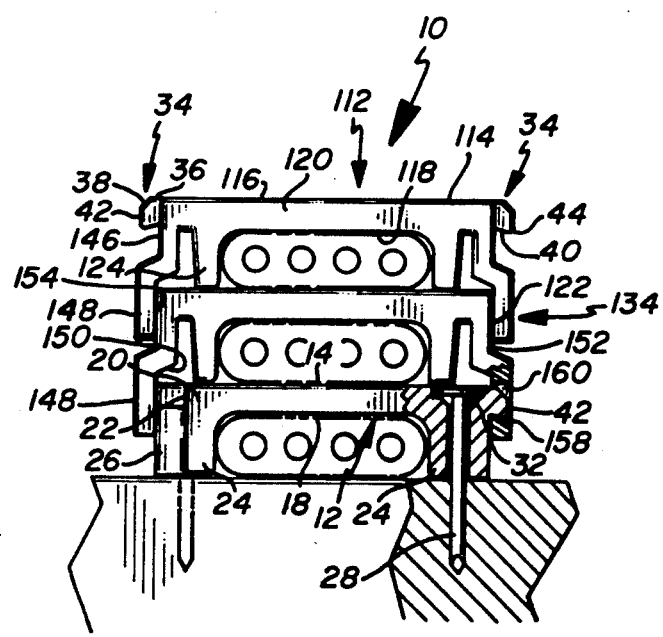
FIG. 3 shows a front elevational view of the stacking cable clamp of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "end", "side", "vertical", "downward", "inner", "outer", "outwardly", and similar terms are used herein, it should be understood that these terms have reference only to the structure shown in the drawings as it would appear to a person viewing the drawings and are utilized only to facilitate describing the invention.

DESCRIPTION

A stacking cable clamp according to the preferred teachings of the present invention is shown in the drawings and generally designated 10. Clamp 10 includes a base staple or fastening strap 12 of a generally U-shape and generally of the type of U.S. Pat. No. 3,241,797. In the preferred form, strap 12 includes a flat, planar, generally rectangular shaped, horizontal top 14 including a top surface 16, a parallel bottom surface 18, first and second, parallel sides 20, and first and second, parallel ends 22 extending perpendicularly between sides 20. Strap 12 further includes first and second, spaced, parallel, flat, planar, generally rectangular shaped, vertical legs 24 integrally extending perpendicularly from bottom surface 18 and parallel to but spaced inwardly from ends 22. Strap 12 further includes first and second columns 26 each having a semicircular cross section of a diameter less that the width of legs 24. The flat sides of columns 26 are formed integrally with legs 24 intermediate the sides of legs 24, and the tops of columns 26 are integrally formed with bottom surface 18 of top 14. Ends 22 extent tangentially from the arcuate side of columns 26. First and second, vertical nails 28 extend through an aperture 30 formed in top 14, legs 24 and columns 26. Counterbores 32 may be formed in top 14 for apertures 30 for receiving the heads of nails 28.

Strap 12 further includes first and second latching ears 34 integrally formed with ends 22 of top 14. Ears 34 have a width less than the width of top 14 and in the most preferred form have a width generally equal to the diameter of columns 26. The top surfaces of ears 34 each include a first flat portion 36 extending coplanar with and from top surface 16 and a second flat portion 38 extending from portion 36 at a downward angle in the order of 45°. The bottom surfaces 40 of ears 34 extend from bottom surface 18 at a downward angle in the order of 15°. Vertical, end surfaces 42 extend downward from the outside ends of flat portions 38 generally parallel to and spaced outwardly from ends 22 and legs 24. Bevel surfaces 44 extend inwardly from the lower edge of end surfaces 42 at an angle in the order of 45° and intersect with and are integrally formed with bottom surfaces 40 at an angle in the order of 65°.

It can then be appreciated that strap 12 is generally of a U-shaped configuration for capturing an electrical cable in place in the same manner as prior fastening straps such as of the type shown and described in U.S. Pat. No. 3,241,797. Thus, strap 12 can be used singularly in the same manner as prior fastener straps. Additionally, fastening strap 12 according to the preferred teachings of the present invention performs as a base for clamp 10 for holding additional cables in place.

In this regard, clamp 10 according to the preferred teachings of the present invention includes a stacking staple 112 for removable securement to strap 12. In the preferred form, staple 112 includes a flat, planar, generally rectangular shaped, horizontal top 114 of a size and shape complementary and corresponding to top 14 of strap 12. Top 114 includes a top surface 116, a parallel bottom surface 118, first and second, parallel sides 120, and first and second, parallel ends 122 extending perpendicularly between sides 120. Staple 112 further includes first and second, spaced, parallel, flat, planar, generally rectangular shaped, vertical legs 124 integrally extending perpendicularly from bottom surface 118 and parallel to but spaced inwardly from ends 122. Legs 124 are of a size, shape, and position complementary to and corresponding to legs 24 of strap 12.

Staple 112 further includes first and second latching ears 34 integrally formed with ends 122 of top 114 in a manner complementary to and corresponding to ears 34 of strap 12.

Staple 112 further includes first and second latching hooks 134 integrally formed with top 114 adjacent ends 122 and spaced outwardly from and generally parallel to legs 124. In the preferred form, hooks 134 are of a generally elongated Z shape including a first portion or plate 146 interconnected to a second, parallel, portion or plate 148 by an angular portion or plate 150, with plate 148 extending beyond the free ends of legs 124. The outer surfaces 152 of plates 146 extend vertically downward from and are flush with ends 122 of top 114 while the inner surfaces of plates 146 are spaced outwardly of legs 124. Ears 34 extend beyond outer surfaces 152 of plates 146. The inner surfaces 154 of plates 148 extend vertically downward from plates 150 and are flush with ends 122 of top 114 and outer surfaces 152 of plates 146. Hooking apertures 156 are formed in plates 148 of a size, shape, and location complementary to and for slideably receiving and latching with ears 34 of strap 12 or staple 112. Particularly, the bottom surfaces 158 of apertures 156 extend outwardly at a downward angle in the order of 105° corresponding to and complementary to the angle of bottom surface 40 of ears 34. The top surfaces 160 of apertures 156 are spaced from surfaces 158 a distance greater than the vertical height of ears 34 and at a level corresponding to and slightly above the lower extent or free ends of legs 124.

When it is desired to stack a second cable on top of a first cable fastened in place with strap 12, staple 112 can be placed to straddle the second cable, with the cable located under surface 118 between legs 124. One method of installation is to position one of latching hooks 134 to engage the corresponding latching ear 34 of strap 12. It can be appreciated that in this position, ear 34 extends and is located within aperture 156, with leg 124 abutting with or closely adjacent top surface 16 of strap 12. At that time, staple 112 with the cable captured therein is pivoted about ear 34 until the lower edge of plate 148 of the other latching hook 134 engages with top surface portions 36 and 38 of the corresponding ear 34. Due to the downward angle of portions 38, latching hook 134 will cam outwardly on ear 34, with plates 146 and 148 of one or both latching hooks 134 bending and flexing outwardly to allow latching hooks 134 to pass over ear 34. When hooking aperture 156 of latching hook 134 corresponds to the location of ear 34, latching hooks 134 will return to their natural condition capturing ears 34 in hooking apertures 156 of hooks 134, with bevel surface 44 aiding in the slideable receipt of ear 34 into aperture 156. It should be noted that in the attached or installed condition, further downward movement is prevented by legs 124 abutting with top surface 16 of strap 12, and outward movement is prevented by bottom surface 40 of ears 34 abutting with bottom surface 158 of hooking apertures 156 of hooks 134. It should then also be noted that the cable is held by and between top surface 16 of strap 12 and bottom surface 118 and legs 124 of staple 112.

It can then be appreciated that the provisions of ears 34 on staple 112 allow staples 112 to be attached to and stacked on each other. Thus, if it was desired to stack a third or more cable on top of the first and second cable, further staples 112 according to the number of cables desired to be stacked can be attached and installed on staple 112 as desired. It can be appreciated that when staples 112 are stacked on each other, inside surfaces 154 of plates 148 of hooks 134 of the upper staple 112 are slideably received on outside surfaces 152 of plates 146 of hooks 134 of the lower staple 112.

To remove staple 112 previously installed on another staple 112 or on strap 12 according to the teachings of the present invention, a sharp edge such as that of a knife or screwdriver can be inserted under surface 154 and twisted causing plate 148 and hooks 134 to bend or flex outwardly beyond ear 34 at which time staple 112 can be removed. Specifically, no nails are needed to be pulled when it is desired to remove stacked cables from clamp 10 according to the preferred teachings of the present invention.

It can then be appreciated that the construction of strap 12 and staple 112 according to the preferred teachings of the present invention is believed to be particularly advantageous. For example, the separate formation of hooks 134 from legs 124 is advantageous in allowing ease of bending and/or flexing of hooks 134. Further, as downward movement is prevented by legs 124 rather than hooks 134, the possibility of hooks 134 unlatching from downward pressure is practically eliminated.

Likewise, the corresponding angles of bottom surfaces 40 of ears 34 and bottom surfaces 158 of apertures 156 of hooks 134 provide a locking interlock to prevent unlatching. In fact, this interlock is enhanced if an outward pressure is placed upon staple 112 such as when the cable held by staple 112 is pulled because top 114 will tend to bow outward causing the bottom surfaces 40 and 158 to further cinch together to prevent release.

Straps 12 and staples 112 according to the preferred teachings of the present invention can be dimensioned and designed to hold various sizes and types of electrical cables. As with prior fastening straps, tops 14 and 114 permit the use of straps 12 and staples 112 for holding either flat or round cables.

It can be appreciated that straps 12 and staples 112 according to the preferred teachings of the present invention can be formed of plastic as shown, metal such as a metal stamping, or by any suitable material. Fabrication from metal is particularly advantageous where it is necessary to hold cables under relatively large forces.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalence of the claims are intended to be embraced therein.

What is claimed is:

1. Clamp for clamping cables comprising, in combination: a substantially rigid, one-piece staple comprising, in combination: a top having first and second ends and a bottom surface; first and second legs integrally extending from the bottom surface of the top and spaced from the ends of the top and having free ends; and first and second latching hooks integrally extending from the bottom surface of the top separate from and spaced outwardly from the first and second legs and adjacent to the ends of the top, with the latching hooks extending beyond the free ends of the legs.

2. The clamp of claim 1 wherein the staple further comprises, in combination: first and second latching ears extending from the first and second ends of the top, with the latching hooks including means for latching with the latching ears of other clamp.

3. The clamp of claim 2 wherein the latching hooks comprise a first portion and a second portion, with the first portion having an outer surface, with the ears extending beyond the outer surface, with the second portion having an inner surface generally at the same extent as the outer surface of the first portion, with the inner surface of the second portion being slideable on the outer surface of the first portion when the staples are stacked.

4. The clamp of claim 3 wherein the latching means comprises, in combination: a latching aperture formed in the second portion for slideable receipt of the ears of other clamp.

5. The clamp of claim 4 wherein the ears include a bottom surface extending at a downward angle from the top; and wherein the latching aperture includes a bottom surface extending at an angle complementary to and for abutment with the bottom surface of the ear for providing an interlock between the latching ear and the latching hook when the staples are stacked.

6. The clamp of claim 5 wherein the ears include a top surface extending at a downward angle from the top, with the top surface of the ears camming the second portion of the latching hooks outwardly when the staples are stacked.

7. The clamp of claim 6 further comprising, in combination: a fastening strap of a generally U-shape comprising, in combination: a top; first and second legs extending from the top; first and second nails extending through the first and second legs of the fastener strap; and first and second latching ears extending from the opposite ends of the top of the fastening strap.

8. Clamp for clamping cables comprising, in combination: a substantially rigid, one-piece staple comprising, in combination: a top having first and second ends and a bottom surface; first and second legs extending from the bottom surface of the top and spaced from the ends of the top and having free ends; first and second latching hooks extending from the bottom surface of the top spaced outwardly from the first and second legs and adjacent to the ends of the top, with the latching hooks extending beyond the free ends of the legs; first and second latching ears extending from the first and second ends of the top, with each of the latching hooks including a latching apertures for slideable receipt of the ears for latching with the latching ears of other clamps.

9. The clamp of claim 8 wherein the ears include a bottom surface extending at a downward angle from the top; and wherein the latching aperture includes a bottom surface extending at an angle complementary to and for abutment with the bottom surface of the ear for providing an interlock between the latching ear and the latching hook when the staples are stacked.

10. Clamp for clamping cables comprising, in combination: a substantially rigid, one-piece staple comprising, in combination: a top having first and second ends and a bottom surface; first and second legs extending from the bottom surface of the top and spaced from the ends of the top and having free ends; first and second latching hooks extending from the bottom surface of the top spaced outwardly from the first and second legs and adjacent to the ends of the top, with the latching hooks extending beyond the free ends of the legs; and first and second latching ears extending from the first and second ends of the top, wherein the ears include a top surface extending at a downward angle from the top, with the top surface of the ears camming the latching hooks outwardly when the staples are stacked.

11. The clamp of claim 1 further comprising, in combination: a fastening strap of a generally U-shape comprising, in combination: a top; first and second legs extending from the top; first and second nails extending through the first and second legs of the fastener strap; and first and second latching ears extending from the opposite ends of the top of the fastening strap, with the latching hooks including means for latching with the latching ears.

12. The clamp of claim 11 wherein the latching means comprises, in combination: a latching aperture for slideable receipt of the ears.

13. The clamp of claim 12 wherein the ears include a bottom surface extending at a downward angle from the top; and wherein the latching means comprises a latching aperture including a bottom surface extending at an angle complementary to and for abutment with the bottom surface of the ear for providing an interlock between the latching ear and the latching hook.

14. The clamp of claim 13 wherein the ears include a top surface extending at a downward angle from the top, with the top surface of the ears camming the latching hooks outwardly.

15. The clamp of claim 14 wherein the latching hooks comprise a first portion and a second portion, with the first portion having an outer surface, with the ears extending beyond the outer surface, with the second portion having an inner surface generally at the same extent as the outer surface of the first portion, with the inner surface of the second portion being slideable on the outer surface of the first portion when the fastening strap and staples are stacked.

16. The clamp of claim 1 wherein the latching hooks comprise a first portion and a second portion, with the first portion having an outer surface, with the second portion having an inner surface generally at the same extent as the outer surface of the first portion, with the inner surface of the second portion being slideable on the outer surface of the first portion when the staples are stacked.

17. Clamp for clamping cables comprising, in combination: a substantially rigid, one-piece staple comprising, in combination: a top having first and second ends and a bottom surface; first and second latching hooks extending from the bottom surface of the top adjacent to the ends of the top, with the latching hooks comprising, in combination: a first portion and a second portion, with the first portion having an outer surface, with the second portion having an inner surface generally at the same extent as the outer surface of the first portion, with the inner surface of the second portion being slideable on the outer surface of the first portion of another staple when the staples are stacked; and first and second latching ears extending from the first and second ends of the top, with the ears extending beyond the outer surface of the first portion.

18. The clamp of claim 17 wherein the latching hooks include means for latching with the latching ears.

19. The clamp of claim 18 wherein the latching means comprises, in combination: a latching aperture formed in the second portion for slideable receipt of the ears.

20. The clamp of claim 17 further comprising, in combination: a fastening strap of a generally U-shape comprising, in combination: a top; first and second legs extending from the top; first and second nails extending through the first and second legs of the fastening strap; and first and second latching ears extending from the opposite ends of the top of the fastening strap, with the second portion of the latching hooks including means for latching with the latching ears.

* * * * *

UNITED STATES PATENT AND TRADEMARK OFFICE
CERTIFICATE OF CORRECTION

PATENT NO. : 5,201,484

DATED : April 13, 1993

INVENTOR(S) : Bud Thoen

Page 1 of 2

It is certified that error appears in the above-identified patent and that said Letters Patent is hereby corrected as shown below:

In the Title page, left column, after "et al. ..... 248/68.1" insert
--508,687 11/1893 Duggan
1,529,881 3/1925 Engle
2,526,902 10/1950 Rublee
2,570,957 10/1951 Lee
3,085,129 4/1963 Anderson
3,241,797 3/1966 Anderson
3,388,881 6/1968 Anderson
3,684,817 8/1972 Card et al.
3,894,174 7/1975 Cartun
4,127,250 11/1978 Swick
4,131,257 12/1978 Sterling
4,356,599 11/1982 Larson et al.
4,582,288 4/1986 Ruehl--.

In the Title page, left column, after "of Germany." insert
--OTHER DOCUMENTS
3M Brand Stak-It Cable Stacker, Product Bulletin, ©1990
Handy Strap Stackers, Sturgeon Bay Metal Products, Inc.
Caddy Newsletter #233, ©1990 ERICO® Products, Inc.
Caddy Installation Instructions, ©1990 ERICO® Products, Inc.--.

Column 5, line 61, cancel "integrally".

Column 5, line 64, cancel "integrally".

Column 6, line 5, cancel "clamp" and substitute therefor --clamps--.

Column 6, line 18, cancel "clamp" and substitute therefor --clamps--.

UNITED STATES PATENT AND TRADEMARK OFFICE
CERTIFICATE OF CORRECTION

PATENT NO. : 5,201,484
DATED : April 13, 1993
INVENTOR(S) : Bud Thoen

Page 2 of 2

It is certified that error appears in the above-indentified patent and that said Letters Patent is hereby corrected as shown below:

Column 6, line 50, cancel "apertures" and substitute therefor --aperture--.

Signed and Sealed this

Eighteenth Day of January, 1994

Attest:

BRUCE LEHMAN

Attesting Officer

Commissioner of Patents and Trademarks